United States Patent [19]

Dudley

[11] Patent Number: 5,651,881

[45] Date of Patent: Jul. 29, 1997

[54] FLUID RECOVERY ASSEMBLY

[76] Inventor: Robert H. Dudley, 1033 Essex Cir., Kalamazoo, Mich. 49008

[21] Appl. No.: 563,675

[22] Filed: Nov. 28, 1995

[51] Int. Cl.$^6$ .............................. B01D 33/06; B01D 21/26
[52] U.S. Cl. ........................ 210/174; 210/374; 210/377; 210/394; 494/7; 494/42; 494/901
[58] Field of Search .................................. 210/367, 374, 210/377, 174, 394; 494/7, 36, 42, 84, 901; 188/6.24

[56] References Cited

U.S. PATENT DOCUMENTS

| | | |
|---|---|---|
| 1,520,467 | 12/1924 | Frantz . |
| 3,483,991 | 12/1969 | Humphrey . |
| 4,137,176 | 1/1979 | Dudley et al. . |
| 4,186,096 | 1/1980 | Areaux et al. . |
| 4,186,097 | 1/1980 | Dudley et al. . |
| 5,227,057 | 7/1993 | Lundquist ............................... 210/374 |

*Primary Examiner*—David A. Reifsnyder
*Attorney, Agent, or Firm*—Bliss McGlynn, P.C.

[57] ABSTRACT

A fluid recovery assembly continuously separates lubrication liquid from lubrication-impregnated shavings. The fluid recovery assembly includes a shredder which receives and shreds the lubrication-impregnated shavings. A centrifugal drum rotates the lubrication-impregnated shavings at a speed sufficient to pull the lubrication out of the lubrication-impregnated shavings. A single electrical motor supplies the energy to rotate the centrifugal drum, the shredder and any other hydraulically actuated accessory. When the high inertia centrifugal drum is accelerated to operating speed, little power is needed to keep it rotating. The path in which the fluid flows is changed from a free flow path (back to the reservoir) to a path including a hydraulic motor which powers the shredder. Thus, no separate electric motor is needed for the shredder. The shredder power is further enhanced by the flywheel effect of the centrifugal drum.

10 Claims, 3 Drawing Sheets

FLUID RECOVERY ASSEMBLY

BACKGROUND OF THE INVENTION

1. Field of the Invention

The invention relates to a fluid recovery system and, more particularly, two fluid recovery systems using a shredder in combination with a centrifuge.

2. Description of Related Art

Fluid recovery systems continuously remove liquid from lubrication-impregnated chips fabricated from metal and the like. Typically, these systems include a centrifuge which places a centrifugal force on the lubrication-impregnated chips sufficient to separate the liquid lubrication out of the chips. These systems are well known in the art and the teachings in U.S. Pat. Nos. 3,233,735, 3,366,318, and 3,850,814 are representative of such structures.

In several embodiments, a shredder is needed to reduce the size of the lubrication-impregnated chips prior to being spun by the centrifuge. The shredder shreds long strands of chips into smaller strands. The shredder also chips into smaller strands. The shredder also separates clumps of chips or strands of chips by reducing the mass of each individual entity so that each entity, a strand or chip, will be affected by the centrifugal force created by the centrifuge.

The shredder is usually an item which is added to the path through which the chips are processed. The shredder is operated independently of the centrifuge. Therefore, the shredder is equipped with a motor which is used exclusively to operate the shredder. The motor and transmission for the shredder increase the cost and space associated with the shredder. Additionally, the motors used to operate the shredders must be reversible so that the large masses which jam the shredders may be repositioned. Fly wheel assemblies, used to briefly increase the torque applied to the shredder elements, are cost prohibitive.

As with the shredder, the centrifuge is rotated by a motor dedicated thereto. Because the centrifuge is a large frustrum-shaped metal drum, its mass is great. The motor used to rotate the centrifuge must be capable of overcoming the inertia of this mass. Once the centrifuge is rotating, much less energy is required to maintain the rotational speed of the centrifuge. Therefore, much of the capacity of this motor is not used throughout the majority of its operating life.

Another inertial issue arises when the motor operating the centrifuge is turned off. Namely, the inertia possessed by the mass of the centrifuge maintains the rotational speed of the centrifuge long after the motor has turned off. This continued rotation is a safety hazard because it is rotating silently in an environment which is typically noisy and where human beings are wearing ear protection. Another problem associated with the continued rotation of the centrifuge is the excessive wear on bearings and parts associated therewith. Braking systems have been used to reduce the time the centrifuge is rotating. These systems, however, sharply increase the system cost and maintenance.

SUMMARY OF THE INVENTION

A fluid recovery assembly for continuously separating lubricating liquid from lubrication-impregnated shavings is disclosed. The fluid recovery assembly comprises a shredder for receiving and shredding the lubrication-impregnated shavings. A centrifugal drum having a drum shaft to rotate the centrifugal drum is also included. A motor having a rotatable drive shaft to create a rotational motion is used to rotate the centrifugal drum. A centrifugal powered transmission transmits the rotating motion of the rotatable drive shaft to the drum shaft to rotate the centrifugal drum. The fluid recovery assembly also includes a hydraulic system between the shredder and the motor to rotate the shredder.

The advantages associated with the invention are many. First, by powering the shredder with the motor used to rotate the centrifuge, costs are reduced and space requirements of a second motor are eliminated. Second, the hydraulic system provides an inexpensive braking system for the centrifuge. Third, the hydraulic system allows the centrifuge drum to become a fly wheel for the shredder so that the shredder may overcome brief overload conditions. Fourth, the capacity of the motor is more fully utilized by using it to operate both the centrifuge and the shredder.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
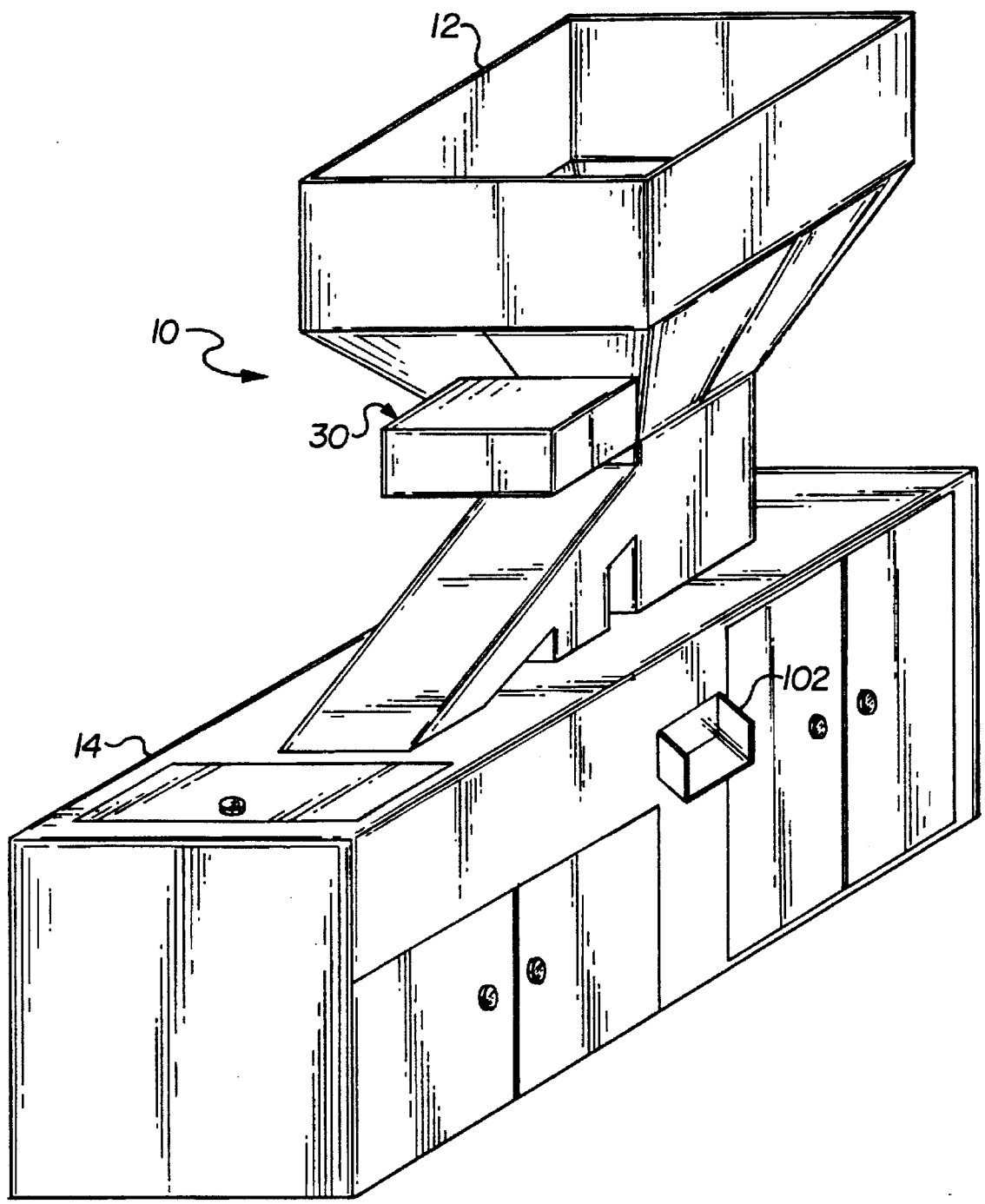
FIG. 1 is a perspective view of the preferred embodiment of the present invention.
Figure 2:
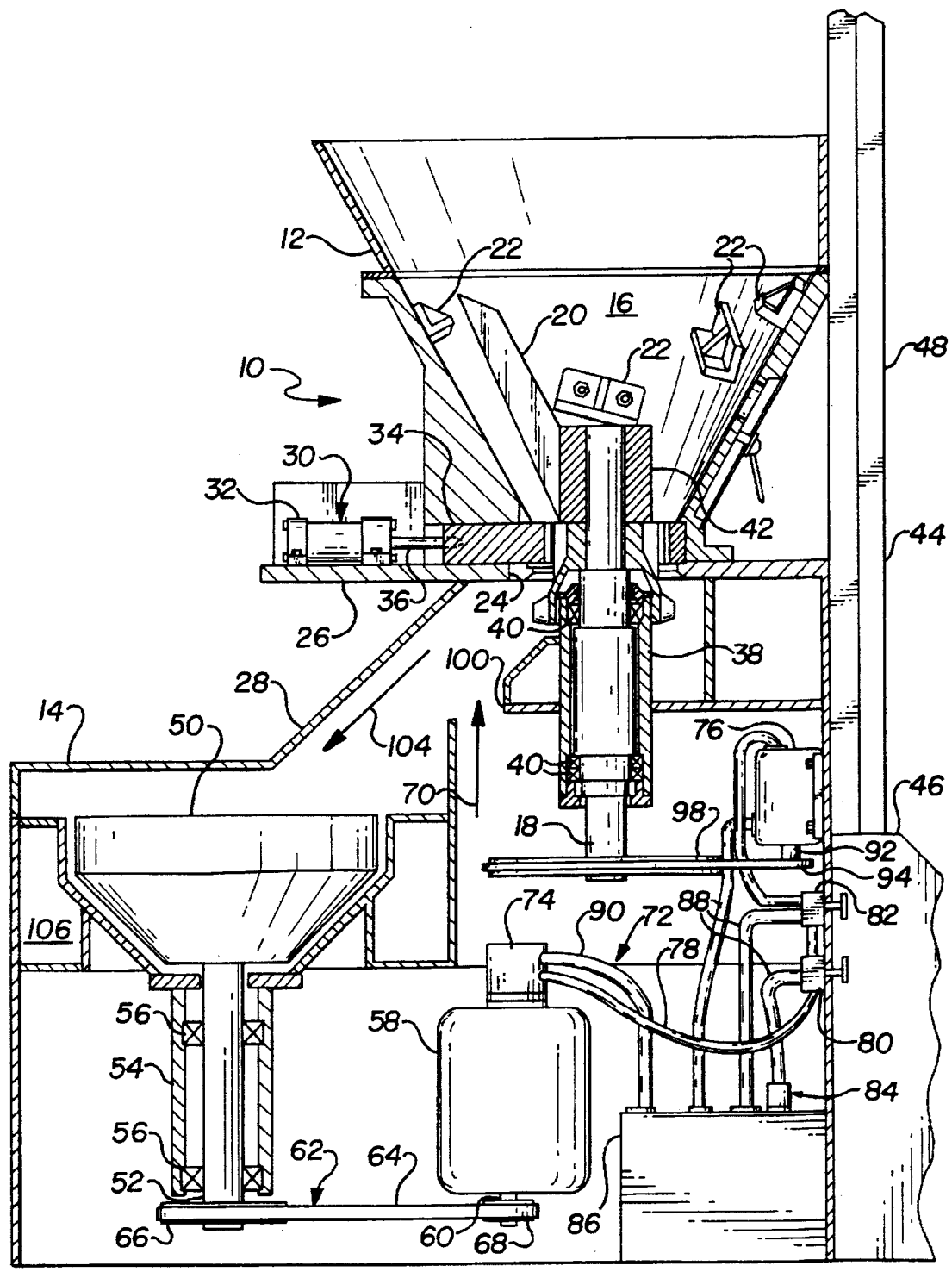
FIG. 2 is a cross-sectional view of the preferred embodiment of the invention.

Referring to FIGS. 1 and 2, the invention, a fluid recovery system, is generally indicated at 10. The fluid recovery assembly 10 continuously separates the lubricating liquid from lubrication-impregnated shavings, chips, strands, and the like (hereinafter "shavings"). The fluid recovery assembly 10 includes a collector 12 and a separating assembly 14. The lubrication-impregnated shavings are dropped into the collector or hopper 12 where they are shredded by a shredder 16. The shredder includes a shredder shaft 18 which rotates at least one blade 20. The blade 20, in combination with a plurality of strand separators 22, separates the strands of lubrication-impregnated material so that the strands, along with the shavings, may fall through a receiving hole 24 and enter the separating assembly 14. The blade 20 also churns the material to facilitate a constant flow of the material from the shredder 16 into the separating assembly 14.

The collector 12 and shredder 16 are supported by a divider 26 which is a portion of a housing 28 for the entire fluid recovery assembly 10. Also supported by the divider 26 is a release device, generally shown at 30. The release device includes a hydraulic cylinder 32 and an opening adjuster 34 secured thereto by a plunger 36 of the hydraulic cylinder 32. The release device 30 allows unshreddable pieces of material larger than the receiving hole 24 to be removed and drop through the separating assembly 14. Once the large pieces of material have fallen through, the hydraulic cylinder 32 forces the adjustor 34 back into position to continue to regulate the flow of material passing from the shredder 16 into the separating assembly 14.

The shredder shaft 18 includes a housing structure 38 which allows the shredder shaft 18 to rotate about its central access. The housing structure 38 also houses bearings 40 suitable to allow the shredder shaft 18 to rotate with reduced friction. A blade hub 42 secures the blade 20 to the shredder shaft 18. The blade hub 42 is keyed to the shredder shaft 18 so that there is no lost motion between the shredder shaft 18 and the blade 20. Although not shown, another embodiment of the invention may incorporate a two-shaft shredder that pulls the shavings apart by rotating the two shafts, which are disposed adjacent to each other, in opposite directions, as is known in the art.

A shavings loading assembly is generally shown at 44 in FIG. 2. The shavings loading assembly 44 includes a cart port 46 for receiving a cart and an elevation track 48. A cart (not shown) carrying a load of shavings is moved into the cart port 46 where it is attached to a lifting assembly (not shown). The cart is then raised along the elevation track 48. Once the cart is at the top of the elevation track 48, it is rotated to unload the shavings into the collector 12. This shavings loading assembly 44 may also be powered by the hydraulic pump 74, discussed subsequently.

A centrifugal drum 50 includes a drum shaft 52 about which the centrifugal drum 50 rotates. The drum shaft 52 is housed in a second shaft housing 54, along with appropriate bearings 56. The centrifugal drum 50 includes a shaving dispensing edge, and an opening for the discharge of liquid therethrough (neither shown). Also not shown are blades which are attached to the centrifugal drum 50 in the interior thereof. U.S. Pat. Nos. 3,850,814 and 4,137,176 having common inventorship with this invention disclose the centrifugal drum configurations and are hereby incorporated by reference.

A motor 58 creates a rotational motion which rotates the drum shaft 52 and, hence, the centrifugal drum 50. The motor 58 includes a rotatable drive shaft 60 which extends down below the motor 50.

A centrifugal power transmission, generally indicated at 62, transmits the rotating motion of the rotatable drive shaft 60 to the drum shaft 52 to rotate the centrifugal drum 50. The centrifugal power transmission 62 includes one or more belts 64 which is wrapped around a first wheel 66 fixedly secured to the drum shaft 52 and a second wheel 68, fixedly secured to the rotatable drive shaft 60. It may be appreciated by those skilled in the art to modify the centrifugal power transmission 62 depending on space and orientations of the motor 58 and the drum shaft 52.

Although not shown, the motor 58 may include a fan located at the top of the motor 58. The fan cools the motor 58 by forcing air downwardly around the motor 58 in a direction as represented by arrow 70. This air flow will be discussed in greater detail subsequently.

A hydraulic system, generally indicated at 72, is connected between the shredder 16 and the motor 58 wherein the hydraulic system transfers energy from the motor 58 to rotate the shredder 16. The hydraulic system 72 is a lost motion connection therebetween such that abrupt changes in the rotational speed of either of the centrifugal drum 50 or the shredder 16 are absorbed by the hydraulic system 72.

The hydraulic system 72 includes a hydraulic pump 74 connected between the motor 58 and the shredder 16. The hydraulic pump 74 receives rotational energy from the motor 58 and transforms rotational motion of the motor 58 into fluid flow.

The fluid flow generated by the hydraulic pump 74 is received by a hydraulic motor 76 which is connected to the hydraulic pump 74 via a hose 78. The hose 78 includes a first valve 80 and a second valve 82. The first valve 80 is an overflow valve and is operatively connected between the hydraulic pump 74 and the hydraulic motor 76. A pressure release device 84 is connected between the overflow valve 80 and a supply tank 86 where a supply of hydraulic fluid is stored. The pressure relief device 84 relieves pressure in the system if the hydraulic pump 74 and hydraulic motor 76 create a pressure in access of a predetermined pressure. In this embodiment, the predetermined pressure is 3000 lbs. The normal operating pressure for this embodiment is 2000 lbs. The hydraulic motor 76, as well as the first 80 and second 82 valves, and the hydraulic pump 74 all include return lines 88 which return hydraulic fluid to the supply tank 86. A feed line 90 extends between the supply tank 86 and the hydraulic pump 74 to retrieve fluid from the supply tank 86.

The hydraulic motor 76 rotates a drive shaft 92 which rotates a roller chain sprocket or gear 94 fixedly secured thereto. Around the wheel 94 is a second belt which connects the first wheel 94 to a shredder shaft wheel 98 such that the rotation of the hydraulic drive shaft 92 is transferred to the shredder shaft 18 to rotate the shredder shaft 18.

The hydraulic system 72, being hydraulic, allows for lost motion when the shredder 16 potentially slows down or stops due to a jam caused by excess material in shredder 16. The hydraulic system 72 further creates a fly wheel between the shredder 16 and the centrifugal drum 50, which continues to spin even if the shredder shaft 18 is caused to slow down. More specifically, the centrifugal drum 50 acts as a fly wheel assembly for the shredder 16.

Also, the hydraulic system 72 when stopped, acts as a braking system for the centrifugal drum 50. The hydraulic system 72 by slowing the flow of hydraulic fluid through the hydraulic system 72 reduces the speed of rotation of the motor 58 and the rotatable drive shaft 60 connected thereto. This reduction of speed reduces the rotation of the drum shaft 52 and the centrifugal drum 50.

Figure 3:
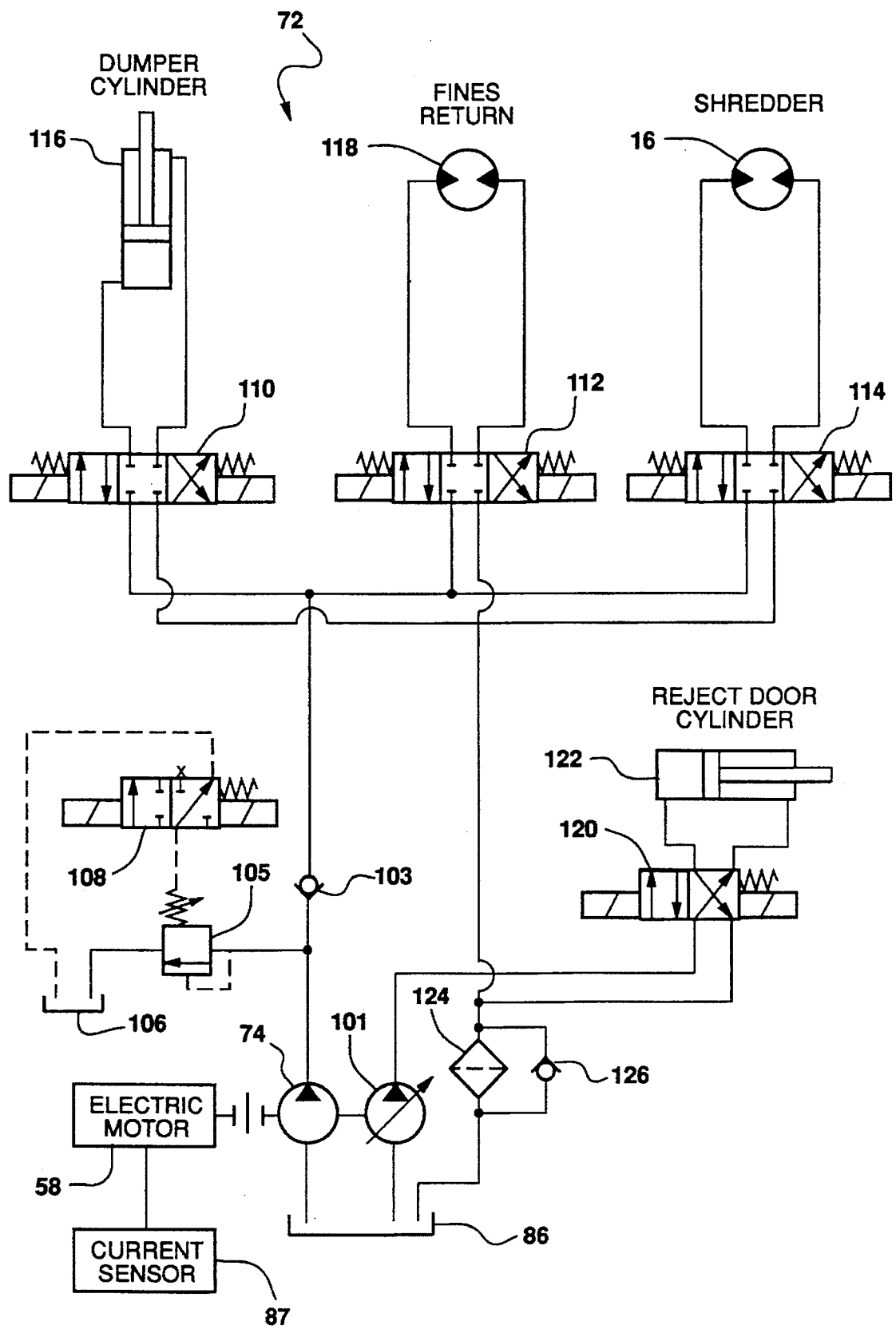
FIG. 3 is a schematic view of the hydraulic system.

Turning to FIG. 3, a schematic of one embodiment of the hydraulic system 72 for the fluid recovery system 10 is shown. The electric motor 58 drives the hydraulic pump 74 which is coupled to the supply tank 86, a pressure compensated pump 101, a check valve 103, and a recycling valve 105. The recycling valve 105 is connected to a reservoir 106 and a control valve 108. During the start-up procedures, fluid is cycled through the recycling valve 105 and the control valve 108. Once enough pressure is received by the control valve 108, the control valve 108 closes the recycling valve 105 forcing fluid flow through the check valve 103.

An electric current sensor 87 is electrically connected to the electric motor 58. The electric current sensor 87 detects the slowing of the centifrugal drum 50 by detecting an increase in current being drawn by electric motor 58. After a predetermined current increase, the shredder 16 is reversed to remove what is impeding its rotation.

The hydraulic fluid then flows to valves 110, 112, 114 to operate a dumper cylinder 116, a fines return 118, and the shredder 16, respectively. It should be apparent to those skilled in the art that any combination of these components may or may not be operated hydraulically. In the embodiment shown in FIG. 3, all of the components 116, 118, 16 are operated hydraulically through reducing the number of electric motors. The dumping cylinder 116 moves the shavings up to be dumped into the collector 12. The fine return 118 is a system which returns fine particles which may pass through the fluid recovery system 10 back into the system so they can be removed in a second cycle.

The fluid flow then enters a fourth valve 120 which forces a reject door cylinder 122 of the release device 30 toward a closed position. Solid objects which obstruct the passageway overcome the pressure created by the reject door cylinder 122 allowing the solid objects to pass therethrough. The fluid flow also passes through a filter 124 and a second check valve 126 before the hydraulic fluid empties into the supply tank 86.

In operation, a cart of material is moved into the cart port 46 where it is secured to an elevator assembly (not shown). The cart is moved up the elevation track 48 at the top of which it is rotated to unload the lubrication-impregnated shavings into the collector 12. The blade 20 of the shredder 16 rotates to separate the lubrication-impregnated shavings and allows the lubrication-impregnated shavings to drop through a receiving hole 24 into the separating assembly 14. Air generated by the fan blades in the centrifugal bowl of the shredder 16 creates the upward flow of air, as represented by the arrow 70. The air prevents fine particles from dropping through a port 100. Solid particles less affected by the air flow drop through the opening 100 and out of the separating assembly 14 through a chute 102, best seen in FIG. 1. The finer particles drop into the centrifugal drum along path 104 where the lubrication is separated from the shavings. The shavings are then removed through a recovery line (not shown). The lubrication is collected in a tank 106 where it is subsequently redistributed for use or disposal in any desired fashion.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

I claim:

1. A fluid recovery assembly for continuously separating a lubricating liquid from lubrication-impregnated shavings, said fluid recovery assembly comprising:

a shredder for receiving and shredding the lubrication-impregnated shavings;

a centrifugal drum having a drum shaft to rotate said centrifugal drum;

a motor having a rotatable drive shaft, to create a rotating motion;

a centrifugal power transmission operatively connecting said drum shaft to said rotatable drive shaft, said centrifugal power transmission transmitting the rotating motion of said rotatable drive shaft to said drum shaft to rotate said centrifugal drum; and a hydraulic system connected between said shredder and said motor to translate the rotating motion of said rotatable drive shaft to rotate said shredder.

2. A fluid recovery assembly as set forth in claim 1 including an electric current sensor electrically connected to said motor.

3. A fluid recovery assembly as set forth in claim 1 wherein a shredder shaft is fixedly secured to said shredder, said shredder shaft receiving rotational motion from said hydraulic system to rotate said shredder.

4. A fluid recovery assembly as set forth in claim 3 wherein said hydraulic system includes a hydraulic motor.

5. A fluid recovery assembly as set forth in claim 4 wherein said hydraulic system further includes a hydraulic pump connected between said motor and said hydraulic motor, said hydraulic pump transforming the rotational motion of said motor into fluid flow receivable by said hydraulic motor.

6. A fluid recovery assembly as set forth in claim 5 wherein an overflow valve is operatively connected between said hydraulic pump and said hydraulic motor.

7. A fluid recovery assembly as set forth in claim 6 wherein a plurality of valves are operatively connected between said hydraulic pump and said hydraulic motor.

8. A fluid recovery assembly as set forth in claim 7 wherein a pressure relief device is operatively connected to said first valve.

9. A fluid recovery assembly for continuously separating a lubricating liquid from lubrication-impregnated shavings, said fluid recovery assembly comprising:

a shredder for receiving and shredding the lubrication-impregnated shavings;

a centrifugal drum having a drum shaft to rotate said centrifugal drum;

a motor having a rotatable drive shaft, said motor rotating said rotatable drive shaft to create a rotating motion;

a power transmission operatively connecting said drum shaft to said rotatable drive shaft, said power transmission transmitting the rotating motion to said drum shaft to rotate said centrifugal drum;

a hydraulic pump connected to said rotatable drive shaft of said motor, said hydraulic pump transforming the rotating motion into fluid flow pressure;

a hydraulic motor operatively connected to said hydraulic pump and said shredder to transform said fluid pressure into a second rotating motion; and a shredder power transmission operatively connected between said hydraulic motor and said shredder, said shredder power transmission transmitting the second rotating motion to said shredder to rotate said shredder.

10. A fluid recovery assembly for continuously separating the lubrication liquid from lubrication-impregnated shavings, said fluid recovery assembly comprising:

a shredder for receiving shredding the lubrication-impregnated shavings, said shredder rotating at a rotational speed;

a centrifugal drum having a drum having a drum shaft to rotate said centrifugal drum;

a motor having a rotatable drive shaft, said motor rotating said rotatable drive shaft to create a rotating motion;

a power transmission operatively connected between said drum shaft and said rotatable drive shaft, said power transmission transmitting the rotating motion to said drum shaft to rotate said centrifugal drum; and a lost motion connection connected between said shredder and said rotatable drive shaft of said motor, said lost motion connection translating the rotating motion of said rotatable drive shaft to rotate said shredder wherein said lost motion connection absorbing abrupt changes in the rotational speed of said shredder.

* * * * *